Patented Jan. 15, 1946

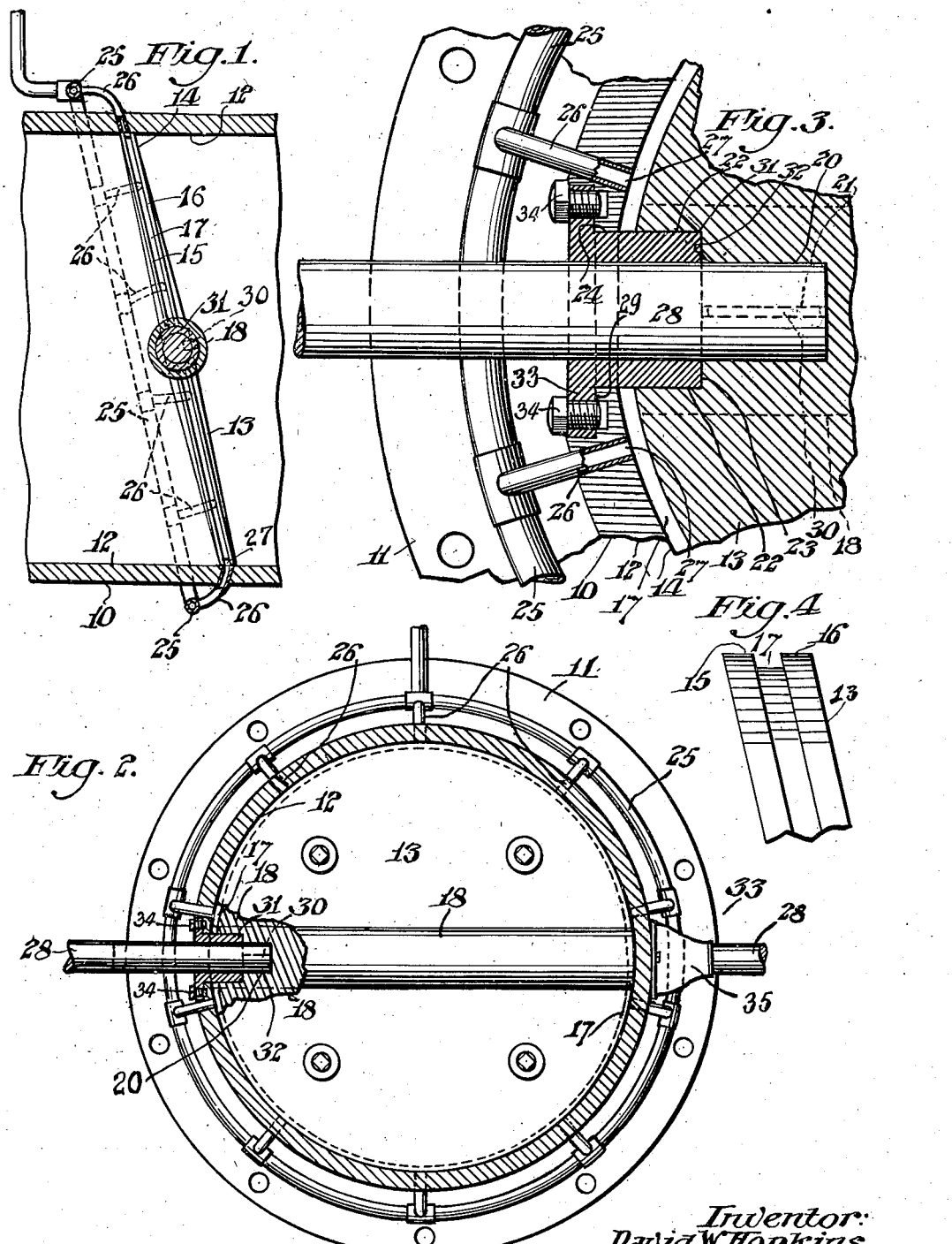

2,392,922

UNITED STATES PATENT OFFICE 2,392,922

LUBRICATED SHUTOFF BUTTERFLY VALVE

David W. Hopkins, Philadelphia, Pa.

Application December 31, 1943, Serial No. 516,340

4 Claims. (Cl. 251—11)

This invention relates to lubricated shut-off butterfly valves, and particularly to a butterfly valve having an angled seating which is sealed by grease.

It is among the objects of the invention; to improve the art of butterfly valves; to provide a butterfly valve for use under normal temperature conditions which will withstand considerable pressures without leakage because of a grease seal, and which is also available for close regulation of fluid flow; to improve the construction of butterfly valves especially in the vane mounting to provide a pressure-tight grease seal completely around the periphery of the vane; to provide a butterfly valve with a grease seal which is of uniform effectiveness throughout the periphery of the vane by providing a substantially uniform clearance throughout all relatively movable surfaces of the valve housing and vane and which clearance is such a minimum as to retain a grease seal against pressure; and other advantages will become apparent as the description proceeds.

In the accompanying drawing forming part of this description;

Fig. 1 represents a fragmentary transverse section through the valve housing and vane assembly of the invention, Fig. 2 represents an elevation of the same, partially in section with one stuffing box removed for clarity, Fig. 3 represents a fragmentary enlarged section of the pivotal assembly of the vane and valve housing section of Fig. 2, and Fig. 4 represents a fragmentary elevation of an edge of the improved vane of this invention.

In its simplest form, the valve comprises a valve housing 10 having end flanges 11, and an inner valve surface 12. A vane 13 is provided having preferably the wide sealing face 14 comprised of two aligned sealing surfaces 15 and 16, separated by the grease-receiving groove or channel 17, all extending peripherally of the vane between supporting bosses 18 to be described. The aligned seating surfaces 15 and 16 of the vane 13 are angularly divergent from the median plane of the vane so as to seat against the inner surface 12 of the valve housing 10 at substantially the relative angularity shown, with the vane in its closed position. The vane has either a single continuous diametrical enlargement 18 or a pair of aligned bosses, through which the axis of oscillation of the vane passes. As both ends of the enlargement, or both bosses, are treated alike, it will be understood that both the left and right hand end of the vane, if the axis is horizontal as shown, are the same in treatment to prevent leakage about the pivot.

As shown in Fig. 3, the end of the boss or enlargement 18 is axially bored with a shaft-receiving bore or recess 20, and at least one end contains a keyway 21. The shaft bore extends well into the vane, and opens into an enlarged recess 22 having a bottom surface 23 in a plane normal to the axis of the bore 20. The axial or cylindrical extent of the enlarged recess 22 extends well across the end of the grease channels 17. That is, it extends axially inwardly beyond the bottom or inner surface of such channel.

In order to receive the vane, shaped and with the seating and sealing surfaces machined as just described, it is necessary to provide openings 24 through the valve housing 10 which are diametrically opposed and centered in the cylinder 10, with the openings of the same diameter as that of the enlarged recess 22, in order to mount the vane, as will be described. It is necessary also to provide a grease manifold 25 preferably extending circumferentially about the valve housing 10, and being connected by suitable conduits 26 with a series of grease ports 27 leading to the inner surface 12 in such positions as to register with the channels 17 at a plurality of points thereof when the vane is in its closed and sealing position in the valve housing 10.

The vane 13 is first connected to operating and support shafts 28, one of which is keyed to the vane by a spline 30 engaging in keyway 21. Then flanged bushings 31 having terminal flanges 33 and planar ends 32 and of a diameter to extend through registering openings 24 and 22 are forced into the said apertures surrounding the shafts 28 to seat upon planar shoulder 23. Preferably, the bushings are held tightly in place, with planar ends 32 tight on shoulders 23 respectively, by suitable cap screws 34 forcing the flange 33 of the bushing into suitable recesses 29 in the outer surface of the valve housing. Usually the flanged ends 33 of the bushings 31 are covered by the conventional stuffing box or gland 35, as will be understood and as indicated at the right hand shaft 28 of Fig. 2. The stuffing box is not part of this invention and has been removed from Fig. 3 for clarity.

I have discovered that with grease under suitable pressure in a space not appreciably greater than .008", it is possible for this grease to maintain a seal which cannot be dislodged by transverse fluid pressures which are relatively high. Of course, the smaller the clearance, the greater the pressure that can be safely withstood without breaking the grease seal so that it is worth while to bring the clearances down to something less than the figure noted. With the bushing and channel arrangement shown, none of the relatively movable surfaces of the assembly need have any greater clearance than .008" in the closed position of the vane, so that when the vane has moved to closed position and the grease in the manifold 25 has its pressure increased to a suitable degree the grease will be extruded through all of the conduits 26 through apertures or grease ports 27 into the juxtaposed channels 17. The grease will therefore seal the space between the vane-sealing surface 14 and the valve housing surface 12, throughout the peripheral extent of the grooves 17, as will be clear. This portion of the sealing is readily seen and appreciated. The difficulty is to maintain a tight seal about the pivot and here is where the importance of the described structure becomes more evident. With the bushing disposition shown, forming the closure for the respective ends of the grease-grooves 17, it will be seen that the bushing 31 has a clearance from the aperture 24 which can be practically as small as desired, even to a driving fit if this should be desired, to insure that no fluid and only a small amount of grease passes outwardly of the valve-housing along the outer surface of the bushing 31. Of course, these two meeting surfaces do not have any relative movement in the movement of the valve but it is important to keep a fluid seal between them. The axial extension of the bushing 31 into the bushing-recess 22 inwardly of the inner or lower surface of the groove or channel 17, is easily accomplished without appreciable increase in the desired limit of degree of clearance, although this is not as important as is the limitation in clearance of the face to face meeting of the spot-faced shoulder 23 in the recesses 22 and 20 of the vane or boss 18, by the planar end 32 of the bushing, especially as controlled by the adjustment of the cap screws 34, which is easily kept at not to exceed .008". The grease that is forced into the clearance between the end of the bushing 31 and the bottom of the bushing-recess, simply seals the space and prevents leakage of the fluid being controlled by the valve outwardly along the shaft 28, although here again the clearance between shaft 28 and the inner surface 29 of the bushing 31 is preferably sufficiently snug as to prevent leakage of fluid axially of the shaft 28.

The operation of the device is simple. For shut-off purposes, the vane is moved to its angular seating position, into which it is readily forced because of the angularity it bears with the valve housing. The grease is then forced into the ring or manifold 25 from any suitable source of grease under pressure, through the housing and into the channel or groove 17 on each side of the axis. The valve is then sealed. When it is desired to open the valve, the grease pressure if maintained is released and the valve "cracked," upon which some portions of the grease will be washed off by the fluid flowing about the vane, but this loss and interference with the clear fluid flow is inconsequential for those installations to which it pertains. Thereafter close regulation of the flow can be had by suitable adjustments of the vane in the housing, in accordance with butterfly valve practices, and with all of the efficiencies of such forms of fluid flow regulation. It is not intended to take care of high temperature fluid control but only those at atmospheric or room temperatures, and within this range the valve is highly efficient and satisfactory.

Having thus described my invention, I claim:

1. In butterfly valves, a housing, a vane in the housing, bosses on the vane, the peripheral edge of the vane between bosses comprised of a pair of spaced aligned surfaces transversely inclined from the median plane of the vane separated by a permanently open grease-receiving groove and substantially planar in transverse cross section, said groove traversing portions of said bosses, and said bosses being axially apertured to a sealing area at a point beyond the level of the grooves to receive a bushing, a flange bushing disposed in the housing having a sealing and engaging said sealing area, and means engaging the flange and housing to force the bushing directly against said sealing surface.

2. In butterfly valves, a substantially cylindrical valve housing, said housing having a bushing-receiving opening diametrical of the housing, a vane in the housing having a diametrical axis, means mounting the vane for pivotal movement relative to the housing at one end of the said diametrical axis of the vane, a boss at the other end of the diametrical axis of the vane, the peripheral edge of the vane between the boss and the pivot being channeled to receive grease, the vane having an axial recess in the boss intersecting the channel of the edge and of substantially the same diameter as and coextensive with the said bushing-receiving opening and concentric with said diametrical axis, a bushing extending through the aligned opening and recess, said vane having an axial opening and concentric with said diametrical axis and substantially coextensive with the bore of said bushing, a shaft in the aligned bore and last mentioned axial opening, and said vane having a shoulder forming a tight engaging fit with the end of said bushing.

3. In butterfly valves, a substantially cylindrical valve housing, said housing having a bushing-receiving opening diametrical of the housing, a vane in the housing having a diametrical axis, means mounting the vane for pivotal movement relative to the housing at one end of the said axis of the vane, a boss at the other end axially of said diametrical axis of the vane, the peripheral edge of the vane between the boss and the pivot being channeled to receive grease, the vane having an axial opening in the boss substantially coextensive with the bushing-receiving bore concentric with said diametric axis, a bushing extending through the aligned openings of the housing and the vane, and having a bore, an axial opening in the vane aligned with the bushing bore, a shaft in the aligned bore and last mentioned axial opening, said vane having a shoulder forming a tight engaging fit with the end of said bushing, said vane having angular engagement with the inner surface of the valve housing in the closed position of the valve, and said vane having a peripheral sealing edge formed of aligned surfaces transversely inclined from the median plane of the vane on each side of the grease-receiving channel forming a permanent channel passage.

4. In butterfly valves, a substantially cylindrical valve housing, said housing having a bushing-receiving opening diametrical of the housing, a vane in the housing having a diametrical axis, means mounting the vane for pivotal movement relative to the housing at one end of the said axis of the vane, a boss at the other end axially of said diametrical axis of the vane, the peripheral edge of the vane between the boss and the pivot being channeled to receive grease, the vane having an axial opening in the boss substantially coextensive with the bushing-receiving bore concentric with said diametric axis, a bushing extending through the aligned openings of the housing and the vane, and having a bore, an axial opening in the vane aligned with the bushing bore, a shaft in the aligned bore and last mentioned axial opening, said vane having a shoulder forming a tight engaging fit with the end of said bushing, said vane having angular engagement with the inner surface of the valve housing in the closed position of the valve, said vane having a peripheral sealing edge formed of aligned surfaces transversely inclined from the median plane of the vane on each side of the grease-receiving channel forming a permanent channel passage, and means for forcing grease from the outside of the valve housing into said channel and into the space between the end of the bushing and said shoulder.

DAVID W. HOPKINS.